United States Patent [19]

Grypczynski et al.

[11] Patent Number: 5,133,925
[45] Date of Patent: Jul. 28, 1992

[54] DEVICE FOR CENTERING A SERVICING TOOL IN A STEAM GENERATOR TUBE

[75] Inventors: Daniel Grypczynski, Lyon; Paul Jacquier, Tassin La Demi; Andre Guglielmo, Villeurbanne, all of France

[73] Assignee: Framatome, Courbevoie, France

[21] Appl. No.: 503,797

[22] Filed: Apr. 3, 1990

[30] Foreign Application Priority Data

Apr. 4, 1989 [FR] France .................. 89 04417

[51] Int. Cl.⁵ ............................................. G21C 19/00
[52] U.S. Cl. ..................................................... 376/260
[58] Field of Search ............... 376/260, 262, 310, 316, 376/247, 258

[56] References Cited

U.S. PATENT DOCUMENTS

| | | |
|---|---|---|
| 4,406,856 | 9/1983 | Wilkins et al. ............... 376/260 |
| 4,656,734 | 4/1987 | Styskar et al. ............... 376/260 |
| 4,728,217 | 3/1988 | Fink ............................ 376/260 |

FOREIGN PATENT DOCUMENTS 0030828 12/1980 European Pat. Off. .

Primary Examiner—Brooks H. Hunt
Assistant Examiner—Frederick H. Voss
Attorney, Agent, or Firm—Pollock, Vande Sande & Priddy

[57] ABSTRACT

The centering device comprises a centering plate (23) mounted on a carrier member (21) for rotation about an axis parallel to the axis of the steam generator tubes and carrying two radial expansion fastening grippers (39), and a drive (22, 27, 28) for orientation of the plate (23) about its axis. The fastening grippers (39) are disposed on the plate in relative positions corresponding to openings provided in the tube plate (18) for the passage of the tubes (13).

11 Claims, 4 Drawing Sheets

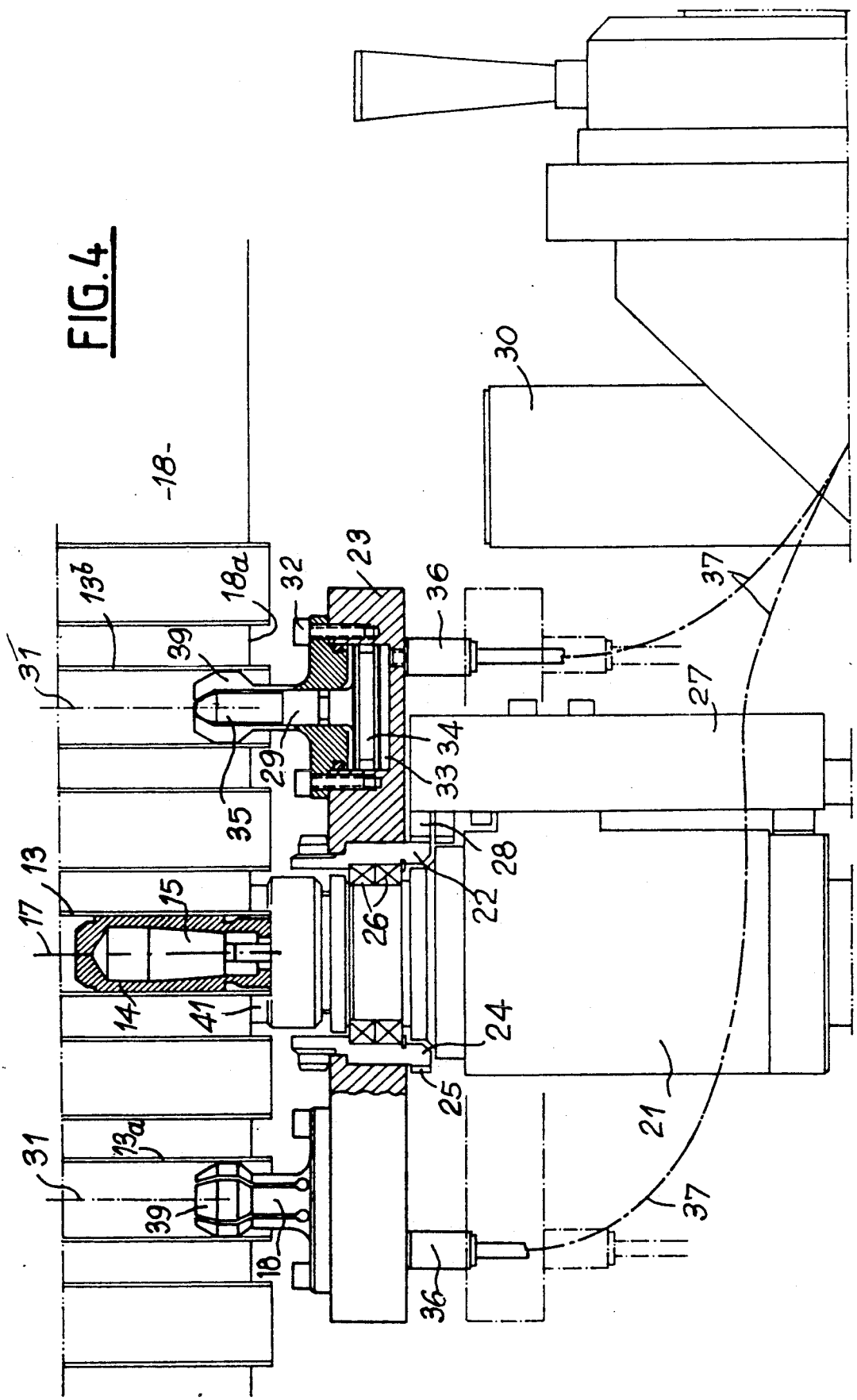

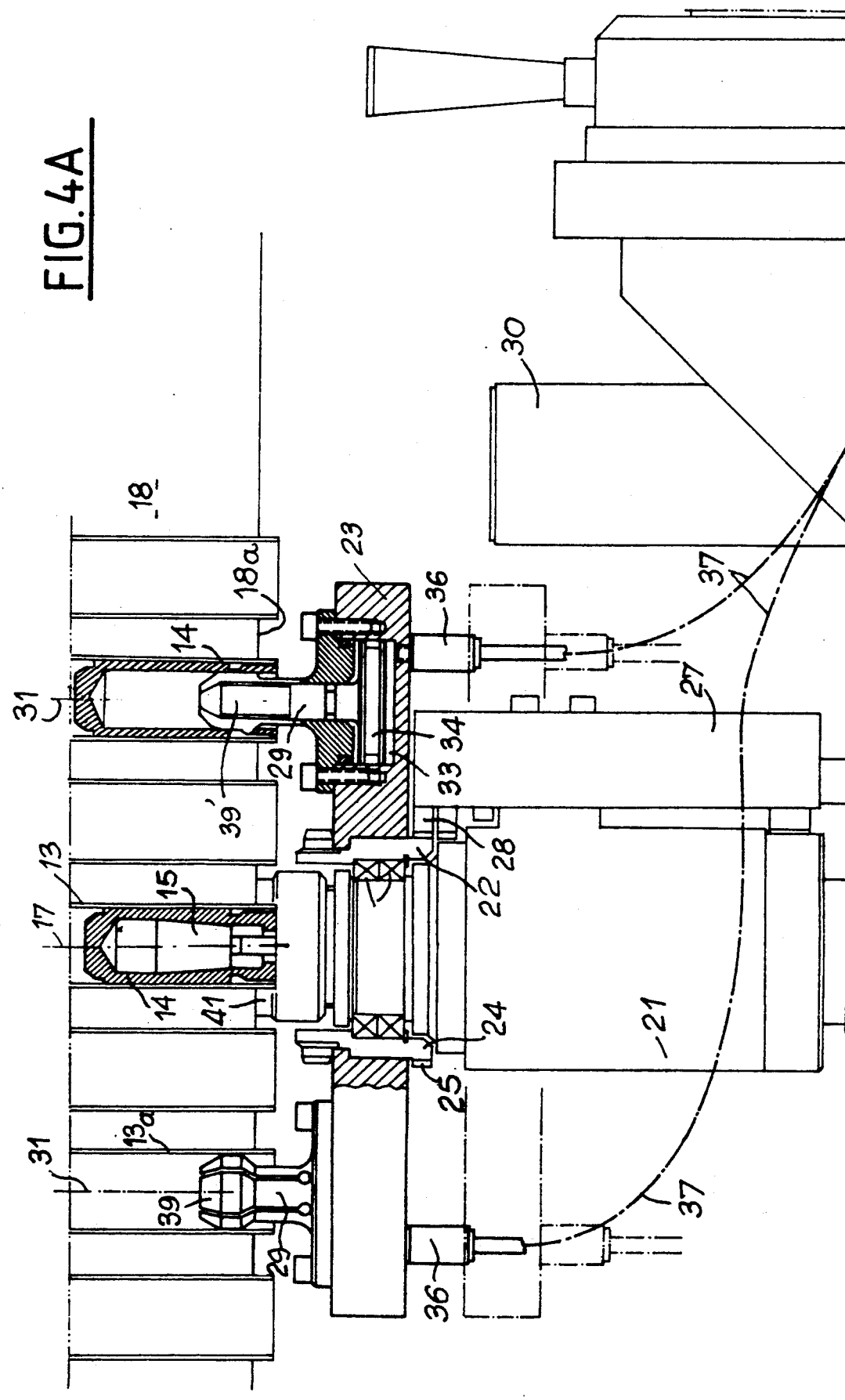

DEVICE FOR CENTERING A SERVICING TOOL IN A STEAM GENERATOR TUBE

FIELD OF THE INVENTION

The invention relates to a device for centering a servicing tool in a steam generator tube.

Steam generators, particularly steam generators in pressurized water nuclear reactors, contain a bundle of tubes whose ends pass through a tube plate provided with a regular network of holes, each of which receives one tube end. The tubes of the bundle end flush with a first face of the tube plate, known as the inlet face, through which the pressurized water constituting the cooling fluid of the nuclear reactor enters the tubes.

BACKGROUND OF THE INVENTION

During shutdowns of the nuclear reactor it is necessary to carry out checking, maintenance and repair operations on the steam generators.

For this purpose use is made of servicing tools or checking probes, which are carried by a displacement device fixed in the steam generator water container located underneath the tube plate.

Certain checks or certain servicing operations require the tool or the checking probe to be placed in a perfectly centered position relative to the tube into which it is introduced. It may also be necessary to absorb loads, if the tool is subjected to a thrust tending to move it out of the tube.

Servicing tools or checking probes for steam generator tubes generally comprise a body of elongate shape adapted to be introduced into the tube to the desired height. In the majority of cases, it is necessary to achieve perfect alignment between the axis of the elongate body of the tool or checking probe and the axis of the tube in which the operation is carried out.

No pivoting means are known for achieving perfect centering of a servicing tool in a steam generator tube i.e., a means making it possible to align the axes of the servicing tool and of the tube in an extremely accurate manner.

SUMMARY OF THE INVENTION

It is an object of the invention therefore to provide a device for the centering or absorption of loads of a servicing tool in a tube of a steam generator comprising a bundle of tubes whose ends pass through a tube plate provided with a regular network of holes, each of which receives one tube end, the servicing tool being introduced into the tube through one face of the tube plate, constituting its inlet face, with which the end of the tube is flush, and the tool being supported by a movable carrier member disposed in the water container of the steam generator, said device permitting very accurate centering of the servicing tool and also effective absorption of loads, by simple operations which can easily be remotely controlled.

To this end, the device according to the invention comprises a centering plate mounted on a rotatable carrier arm for pivoting about an axis parallel to the axis of the steam generator tubes, said plate carrying two radial expansion fastening grippers whose diameter in the unexpanded state is smaller than the inside diameter of a tube of the bundle, and whose diameter in the expanded state is at least equal to the inside diameter of a tube of the bundle, said device further comprising a motorized means for the orientation of the plate about its axis, and the fastening grippers being located on the plate in relative positions corresponding to positions of two openings provided in the tube plate for the passage of the tubes.

BRIEF DESCRIPTION OF THE INVENTION

In order that the invention may be more clearly understood, a description will now be given, by way of example and with reference to the accompanying drawings, of several embodiments of a centering device according to the invention, particularly in the case of the centering of a tool for the electric machining of a closure plug in a steam generator, tube.

FIG. 4 is a view on a larger scale of part of FIG. 3, showing the centering device.

FIG. 4A is a view identical to FIG. 4 in the case where one of the fastening grippers is engaged in a plug.

DETAILED DESCRIPTION

Figure 1:
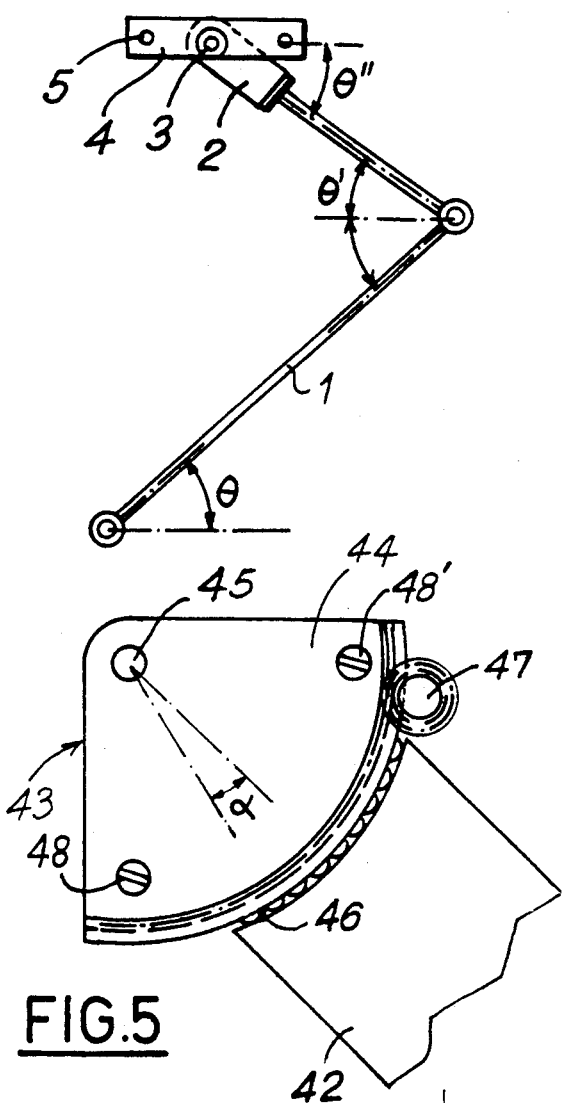
FIG. 1 is a schematic view of a centering device according to a first embodiment of the invention.

FIG. 1 shows a first general embodiment of the invention. A device for the positioning and centering of a servicing tool in a steam generator tube is shown in a plane parallel to the tube plate of the steam generator. This device, located in the water container of the steam generator, comprises an articulated arm 1 consisting of two parts adapted to be oriented relative to each other (arm $\theta/\theta'$) or any other type of carrier having a displacement arm.

The body 2 of the tool 3 is rigidly fixed to the end of the arm 1. A centering plate 4 is mounted for movement about the axis of the tool 3 (at right angles to the plane of the drawing) on a sleeve in which the tool is axially mounted.

The centering plate 4 carries two centering grippers 5 spaced apart by a length equal to an even number of pitches of the network of steam generator tubes.

When the tool 3 is placed in position on the axis of a steam generator tube, the plate 4 can be rotated about the axis of the tool in such a manner that the grippers 5 will be situated in alignment with the axes of two tubes of the bundle of steam generator tubes. The tool and the centering grippers can then be introduced into three tubes in the bundle. The expansion of the grippers 5 in the two tubes situated one on each side of the tube in which the servicing is to be carried out enables perfect centering of the tool to be achieved.

In FIG. 1 the grippers 5 and the tool 3 are shown in aligned positions. These members may however be disposed in non-aligned positions, and may for example form an angle of 90°.

Figure 2:
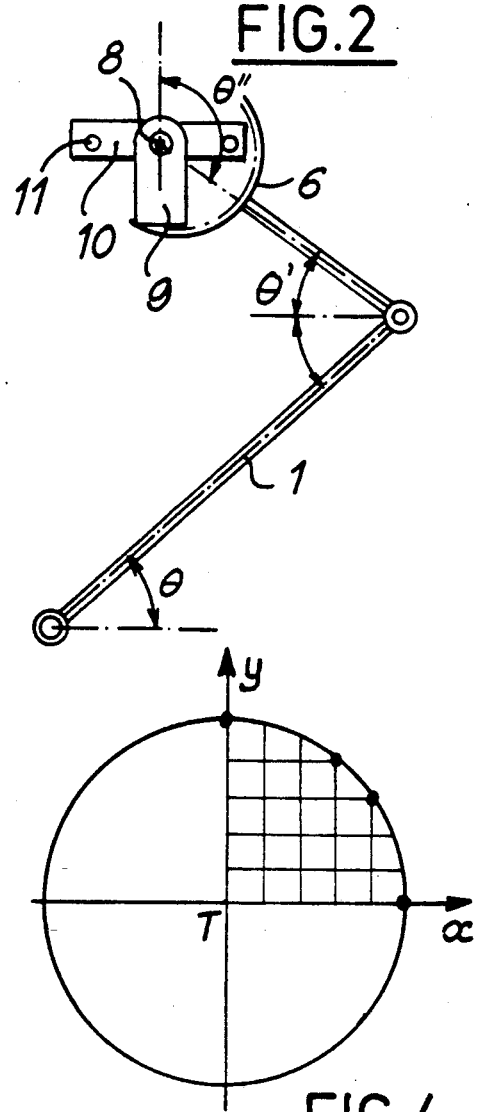
FIG. 2 is a schematic view of a centering device according to a second embodiment of the invention.

FIG. 2 shows a second embodiment of the invention. The tool positioning and centering device is likewise shown in a plane parallel to the tube plate of the steam generator.

It contains the arm (θ/θ') disposed in the water container and already described and illustrated with respect to FIG. 1.

A displacement slide 6 of circular shape, centered on the axis of the tool 8, is fixed to the end of the arm 1.

The body 9 of the tool 8 is mounted on the slide 6 for rotary movement about the axis of the tool 8.

A centering plate 10 carrying two grippers 11 is rigidly fixed on the body 9 of the tool 8.

The grippers 11 are disposed one on each side of the tool 8 and at a distance from one another equal to an even number of pitches of the network.

The arm 1 makes it possible to place the tool 8 in axial alignment with a tube of the bundle in which servicing is to be carried out.

The body 9 of the tool 8 is then turned on the slide 6 to bring the grippers 11 into alignment with two tubes of the bundle.

In this case also it is possible to situate the grippers 11 and the tool 8 on the plate 10 in such a manner that these members are not aligned, but form an angle which may preferably be equal to 90°.

Figure 3:
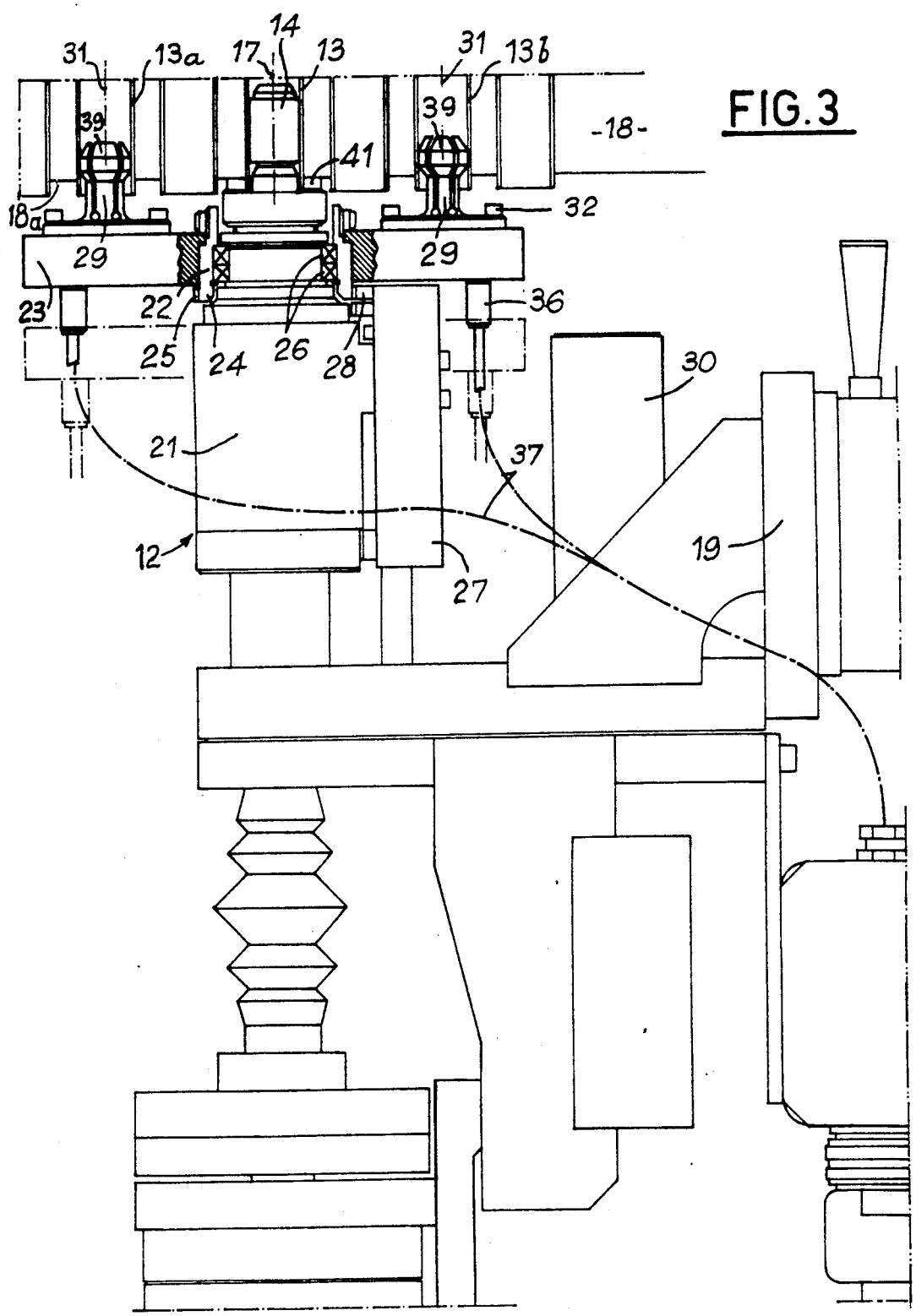
FIG. 3 is a front elevation view, partly in section, of the assembly comprising the servicing tool, its support means and a centering device according to the first principle embodiment principle.

FIG. 3 shows a servicing tool 12 in a steam generator tube, this tool comprising a tool for piercing a closure plug 14 disposed inside a steam generator tube 13 passing through the tube plate 18. An operation of this kind may advantageously be carried out, as described in a copending patent application filed by applicant on the same date as the present patent application, by electrical discharge machining with the aid of an electrode the end part of which is inserted into the plug through the end of the tube 13 lying flush with the inlet face 18a of the tube plate 18.

In order to carry out this operation, it is necessary to achieve perfect alignment of the axis of the electrode, corresponding to its direction of advance, with the axis 17 of the tube 13 in which the closure plug 14 is disposed.

The servicing tool assembly 12 is fixed to the end of an arm 19 mounted inside the water container of the steam generator and enabling the tool 12 to be moved to bring it into alignment with any tube 13 of the steam generator, underneath the tube plate 18.

The tool 12 is mounted inside a tubular sleeve 21, which in turn is fixed on the arm 19 by means of a support.

As can be seen in FIGS. 3 and 4, the device for centering the tool 12 in the tube 13 of the bundle is of the general type shown in FIG. 1. It contains a plate 23 mounted for rotation about the top part of the tubular sleeve 21 with the aid of a bearing 22 consisting of a ring 24 provided with toothing 25 on its outer face, and by ball bearings 26, the inner race of which is fixed on the sleeve 21.

The arm 19 carries, likewise with the aid of the sleeve 21 and its support, an electric motor disposed inside a casing 27 and having an output pinion 28 meshing with the toothed ring 25.

This device permits remote control, with great accuracy, of the orientation of the centering plate 23 about the axis of the tool 12.

As can be seen in FIG. 4, the plate 23 carries two centering grippers 29 in the form of split sleeves, the successive sectors of which, in the circumferential direction, can be moved apart by a pneumatic operating device visible on the gripper 29 shown in section in the right-hand part of FIG. 4.

The nominal diameter of the split sleeve of the gripper 29, when the sectors of said sleeve are not subjected to internal radial expansion, is slightly smaller than the inside diameter of a tube, such as a tube 13a or 13b of the steam generator.

In the unexpanded state, the sleeves 18 can therefore be introduced into two tubes of the network with the aid of a vertical displacement device associated with the arm 19. The vertical displacement may be achieved by means of a jack placed in the sleeve 21, the tool being advanced by the motor 30 driving a vertical threaded rod on which is mounted a nut, which in turn is fastened to the bottom part of the tool on which the sleeve 21 carrying the centering plate 23 is engaged.

The clamp grippers 29 are disposed on the plate 23 in such a manner as to be perfectly symmetrical relative to the axis of the tool 12 corresponding to the axis of the sleeve 21, which it is desired to bring into perfect alignment with the axis 17 of the tube 13 in which the plug 14 to be extracted is located.

Moreover, the distance between the axes 31 of the two grippers 29 is equal to an even number of pitches of the network of tubes, this pitch corresponding to the distance between two axes of successive tubes in a row of tubes in the tube plate.

As can be seen in the case of the gripper 29 shown in section in the right-hand part of FIG. 4, the gripper 29 is fixed leaktightly inside a recess in the plate 23 with the aid of screws 32, in such a manner that a pneumatic jack chamber 33 is delimited between the body of the gripper 29 and the recess in the plate 23. A piston 34 fastened to an actuating rod 35 is mounted inside the cylinder to constitute a pneumatic jack.

The pneumatic jacks of the grippers 29 of the plate 23 are supplied with pressurized air by way of pipes 37 connected to a distributor fixed on the arm 19, and of a nozzle 36.

The upward displacement of the rod 35, through the action of the pressure of the compressed air, makes it possible to bring about the radial expansion of the sectors of the split sleeve constituting the outer part of the gripper 29.

It is possible to use two types of gripper 29, which differ in respect of the nominal diameter of the split sleeves which can be inserted into two tubes 13a, 13b situated symmetrically in a row of tubes in relation to the tube 13 in which servicing is required.

In the course of a campaign, a series of operations are carried out for the reboring of the plug in different zones of the tube plate. It may occur that one of the centering grippers of the tool can be placed only in a tube already containing a rebored plug.

As can be seen in FIG. 4A, one of the split sleeves 39' of the device may have a nominal outside diameter very slightly smaller than the inside diameter of a plug 14 bored with the aid of the electrical discharge machining device (FIG. 4A). The plate 23 is equipped in dependence on the position of the tube 13 in which servicing is required, in such a manner as to insert the centering grippers 29 either in a tube which has not been plugged, or in a tube plugged by a rebored plug.

In order to achieve the positioning of the tool and its perfect centering, the tool provided with its centering device is brought near the tube 13, under the face 18a of the tube plate, in a substantially centered position.

By turning the plate 23 with the aid of the motor driving the pinion 28 and the toothed ring 22, the sleeves and two tubes 13a, 13b of the network of tubes passing through the tube plate, and located one on each side of a tube 13 in which servicing is to be carried out for the extraction of a plug 14, are brought into alignment.

The grippers 29 are inserted into the corresponding tubes 13a, 13b with the aid of the vertical displacement device connected to the arm 19, the introduction of the grippers into the tubes 13a, 13b being effected with the pneumatic jack rods 35 retracted and the sectors of the split sleeve in their retracted position.

Furthermore the split sleeves of the centering devices 29 have a frustoconical part 39 at the top, thus making it possible to facilitate the introduction of the grippers into the corresponding tubes of the network.

Grippers are introduced with the aid of the vertical displacement device connected to the arm 19, simultaneously places the grippers 29 in position in the tubes 13a and 13b and positions an end stop 41 on the tool 12 against the inlet face 18a of the tube plate 18.

The pneumatic jacks of the grippers 29 are then fed, so as to achieve perfect centering of the electrode of the electrical discharge machining tool 12 relative to the tube 13, i.e., perfect alignment of the axis of the electrode with the axis 17 of the tube and of the plug 14.

The operation of piercing the plug 14 with the aid of the electrical discharge machining electrode can be effected with very great accuracy in respect of the alignment of the piercing axis and the axis 17 of the tube 13.

When the operation of piercing the plug 14 has been completed, the electrode is lowered back to its retracted position inside the tubular sleeve 21, the pressure in the centering grippers 29 is relaxed, and the tubular sleeve 21 is moved downwards, either with the aid of a jack incorporated in said tubular sleeve 21, or with the aid of the electrode displacement device which has come into contact with a support stop.

When the electrode centering grippers have been disengaged from the corresponding tubes, the device can be brought, with the aid of the arm 19, opposite a new position permitting piercing by electrical discharge machining of a plug 14 fixed in a new tube 13.

In all cases, the positioning and centering of the tool 12 can be effected with great speed and accuracy by means of operations which can be supervised at a distance, for example by means of a television camera.

Figure 5:
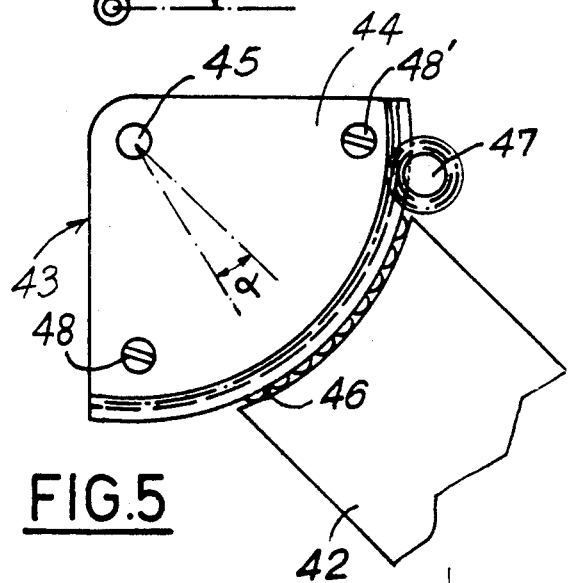
FIG. 5 is a top plan view of a centering device according to the second embodiment of the invention.

FIG. 5 shows a second embodiment of a centering device according to the invention. The tool carrier member is composed of an arm 42 mounted for rotation in the water container of the steam generator, in a plane parallel to the tube plate. At the end of the arm 42 is mounted a tool support 43 in the form of a circular rack 44. The tool 45 defines the working axis of the tool parallel to the axis of the tubes of the bundle whose position corresponds to the center of the circular rack constituting the support 43. The circular rack 44 is mounted for rotation by its circular outer edge, at the end of the arm 42, with the aid of a ball slide 46 or an equivalent system. It has a toothed portion in the form of a circular sector slightly set back relative to the outer edge of the slide, or another equivalent orientation system.

The circular toothed rack is also center on the axis of the tool 45 and is in engagement with a toothed pinion 47 connected to a rotary drive motor. The rack 44 constituting a support carries two centering grippers 48 and 48' similar to the grippers 29 in the embodiment shown in FIGS. 3 and 4.

In the case envisaged of a square mesh network, the axes of the grippers 48 and 48' are situated on two radii of the rack 44 at right angles to one a distance from the axis of the tool 45 equal to five pitches of the tube network.

Figure 6:
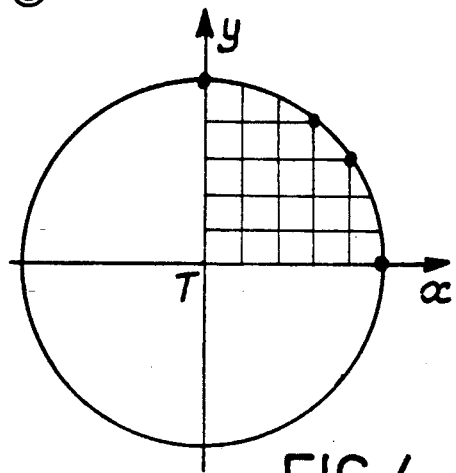
FIG. 6 is a diagram showing the positions of the axes of the tubes in a square mesh network, located on a circle whose radius corresponds to five times the pitch of the tube network.

In this case, as can be seen in FIG. 6, each quadrant contains four positions of axes of tubes of the network, situated at five pitches from a point T representing the position of the axis of the tool.

The coordinates of these points (in the system of axes xTy) in numbers of pitches are as follows: (0, 5); (3, 4); (4, 3) and (5, 0).

When the axes of grippers of the centering device are situated at a distance of five pitches from the axis of the tool, possible numerous possible orientations of the plate are consequently possible for the purpose of putting the grippers into alignment with tubes of the bundle.

If A and B are points on the tool support which are situated at five pitches from the axis of the tool, the angle $\beta = \widehat{ATB}$ can have the following different values:

| | |
|---|---|
| $\tan \beta = 0$ | $\beta = 0$ |
| $\tan \beta = \frac{3}{4}$ | $\beta \simeq 37°$ |
| $\tan \beta = 4/3$ | $\beta \simeq 53°$ |
| $\tan \beta = \infty$ | $\beta = 90°$ | or else the sum of a plurality of these values.

In the case where $\beta$ is equal to 90°, as shown in FIG. 5, the tool being situated in a corner of the support, access is possible to tube openings situated close to obstacles in the water container of the steam generator.

It can be shown that a relationship exists between the angle $\alpha$ defining the relative angular position between the tool and the carrier arm and the angle $\theta$ defining the angular position of the carrier arm depending on the value of the angle $\beta$ selected.

The combination of a rotation of the carrier arm 42 and of the support 43 through predetermined angles, relative to one another, of $\theta$ and $\alpha$, respectively makes it possible to place the grippers 48 and 48' and the tool 45 in desired positions in alignment with the ends of tubes of the bundle lying flush with the inlet face of the tube plate.

For this purpose, the pinion 47 is associated with a motor and a coder enabling the angle $\alpha$ to be controlled by the angle $\theta$ of the rotation of the arm 42. A computer makes it possible to specify the relation to be used in dependence on $\beta$.

The arrangement of the tool 45 at the corner end of the sector 44 also makes it possible to reach the tubes in the bundle whatever their position, particularly when the end of these tubes is close to a wall or an obstacle.

Figure 7:
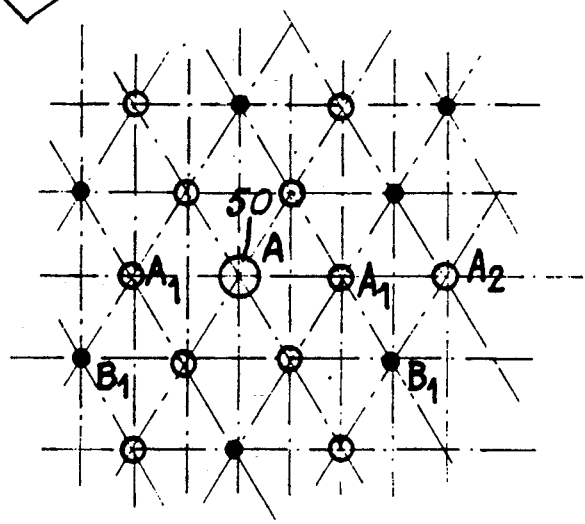
FIG. 7 is a schematic view showing the positions of the axes of the tubes of a triangular mesh network.

In the case of a triangular mesh network, as shown in FIG. 7, consisting of juxtaposed isosceles triangles, the centering grippers can be disposed around the axis 50 of the tool at distances from the tool equal to:

P, 2P, 3P, . . . nP (points A)
or else P $\sqrt{3}$, 2P $\sqrt{3}$, 3P $\sqrt{3}$, . . . nP $\sqrt{3}$, if P is the pitch of the network (points B).

Clamp grippers 39 may be disposed differently on the plate 23, in positions which are symmetrical relative to the axis of the tool, or in asymmetrical positions corresponding to relative positions of two tubes of the bundle.

The centering or load absorption device can be used not only for the positioning and centering of a piercing tool, for example one operating by electrical discharge machining, but also for positioning any tool whose advance inside the tube must proceed along the axis of the tube. The centering or load absorption device can also be used for positioning and moving a checking probe inside a steam generator tube.

We claim:

1. Device for centering a tool for servicing an interior of a tube of a steam generator of a nuclear reactor comprising a bundle of tubes whose ends pass through a tube plate provided with a regular network of holes each of which receives one tube end, said tool being introduced into said tube through one face of said tube plate, constituting its inlet face, with which said tube is flush, said tool being supported by a movable carrier member disposed in a water container of said steam generator and allowing said tool to be displaced in the direction of an axis of said tube, said device for centering comprising:

(a) a centering plate mounted on said carrier member for pivoting movement about an axis parallel to said axis of said tube, said centering plate carrying two radial expansion fastening grippers whose diameter in an unexpanded state is smaller than an inside diameter of a tube of said bundle, and whose diameter in an expanded state is at least equal to said inside diameter of a tube of the bundle;

(b) a motorized means for orientation of said centering plate about its pivoting axis, said fastening grippers being situated on said centering plate in relative positions corresponding to positions of two openings provided in said tube plate for passage of tubes.

2. Centering device according to claim 1, comprising a tool support rigidly fixed to said carrier member, said centering plate being mounted for pivoting on said tool support.

3. Centering device according to claim 2, wherein said tool support comprises a tubular sleeve having an axis on which said tool is mounted, said centering plate being mounted on said tubular sleeve for rotation about its axis.

4. Centering device according to claim 2, wherein said motorized means for orientation of said centering plate about the axis of said tubular sleeve comprises a toothed ring meshing with a pinion driven by a motor.

5. Device according to claim 1, wherein a tool support is mounted on said carrier member for rotation about the axis of said tool and said centering plate is fastened to said tool support.

6. Centering device according to claim 1, wherein said carrier member is an arm mounted for rotary movement in a plane parallel to said tube plate, and said centering plate mounted on an end of said arm for rotation about an axis coinciding with the axis of said tool constitutes said tool support.

7. Centering device according to claim 5, in the case of a square mesh tube network, wherein said centering plate consists of a circular sector connected to an end of said arm, said tool being fixed on the axis of said circular sector and said grippers being fixed on radii of said circular sector at distances from said tool corresponding to five pitches of a tube network.

8. Centering device according to claim 7, wherein said grippers are disposed around the axis of said tool in two positions selected from a set of positions defined in each of the quadrants of a circle centered on said tool and having a radius equal to five pitches of the network, the four positions being defined in each quadrant.

9. Centering device according to claim 7, wherein said circular sector has a circular toothed portion having an axis which coincides with the axis of said tool and which is in engagement with a motorized drive pinion.

10. Centering device according to claim 9, comprising a motor driving said drive pinion and controlled by a motor means rotationally driving said arm.

11. Centering device according to claim 1, wherein said grippers consist of split sleeves which comprise a plurality of sectors and on the axis of each of which is mounted an actuating rod fastened to a piston of a pneumatic jack having a chamber formed in said centering plate.

* * * * *